US012562429B2

(12) United States Patent　(10) Patent No.:　US 12,562,429 B2
Moon　(45) Date of Patent:　Feb. 24, 2026

(54) MECHANICAL VENT FOR BATTERY PACK

(71) Applicant: Polestar Performance AB, Gothenburg (SE)

(72) Inventor: Jongseok Moon, Gothenburg (SE)

(73) Assignee: Polestar Performance AB, Gothenburg (SE)

( * ) Notice: Subject to any disclaimer, the term of this patent is extended or adjusted under 35 U.S.C. 154(b) by 670 days.

(21) Appl. No.: 17/534,097

(22) Filed: Nov. 23, 2021

(65) Prior Publication Data

US 2023/0163406 A1 May 25, 2023

(51) Int. Cl.
*H01M 50/375* (2021.01)
*H01M 50/325* (2021.01)

(52) U.S. Cl.
CPC ....... *H01M 50/375* (2021.01); *H01M 50/325* (2021.01); *H01M 2220/20* (2013.01)

(58) Field of Classification Search
CPC ............. H01M 50/375; H01M 50/325; H01M 2220/20
See application file for complete search history.

(56) References Cited

U.S. PATENT DOCUMENTS

| | | | | |
|---|---|---|---|---|
| 11,319,661 | B1 * | 5/2022 | Maryanski | D06F 58/26 |
| 2006/0121336 | A1 * | 6/2006 | Yoon | H01M 50/325 |
| | | | | 429/61 |
| 2006/0263676 | A1 * | 11/2006 | Chang | H01M 50/528 |
| | | | | 429/74 |
| 2011/0262782 | A1 * | 10/2011 | Zhu | H01M 50/325 |
| | | | | 429/54 |

(Continued)

FOREIGN PATENT DOCUMENTS

| | | |
|---|---|---|
| EP | 3671938 A1 | 6/2020 |
| JP | 2016201333 A * | 12/2016 |
| WO | 2017072697 A1 | 5/2017 |

OTHER PUBLICATIONS

"Pop Goes the Metal: How Temperature Affects Snap Time of a Jumping Disc", Science Buddies, Available online at: https://www.sciencebuddies.org/science-fair-projects/project-ideas/Phys_p094/physics/metal-jumping-disc, Jun. 23, 2020, 14 pages.

(Continued)

*Primary Examiner* — Nicole M. Buie-Hatcher
*Assistant Examiner* — Taylor Harrison Krone
(74) *Attorney, Agent, or Firm* — Kilpatrick Townsend & Stockton LLP

(57) ABSTRACT

A vent for an electric vehicle battery pack configured to transition from a venting, open position to a sealed, closed position in the event of a thermal event experienced by the electric vehicle battery pack, thereby trapping the gasses within the electric vehicle battery pack, including a curved disc shaped and sized to selectively seal an aperture defined by the electric vehicle battery pack, the curved disc formed of a first material on a first major surface of the disc, and a second material positioned on an opposing second major surface of the disc, the first material having a larger coefficient of thermal expansion than the second material, such that an increase in temperature above a defined threshold experienced by the curved disc causes the first material to expand more than the second material, thereby transitioning the curved disc from a first equilibrium state to a second equilibrium state.

7 Claims, 6 Drawing Sheets

(56) References Cited

U.S. PATENT DOCUMENTS

| 2016/0036032 | A1 * | 2/2016 | Zhang ................. | H01M 50/333 |
| | | | | 429/61 |
| 2016/0308254 | A1 * | 10/2016 | Becker-Irvin ....... | H01M 50/597 |
| 2017/0098807 | A1 | 4/2017 | Umeyama et al. | |
| 2020/0176741 | A1 * | 6/2020 | Kang ................. | H01M 50/325 |
| 2022/0077539 | A1 * | 3/2022 | Ren .................... | H01M 50/317 |
| 2023/0307802 | A1 * | 9/2023 | Stock ................. | H01M 50/474 |

OTHER PUBLICATIONS

PCT/EP2022/082909, "International Search Report and Written Opinion", May 24, 2023, 19 pages.

* cited by examiner

100

103

102

108

104A

106

104B

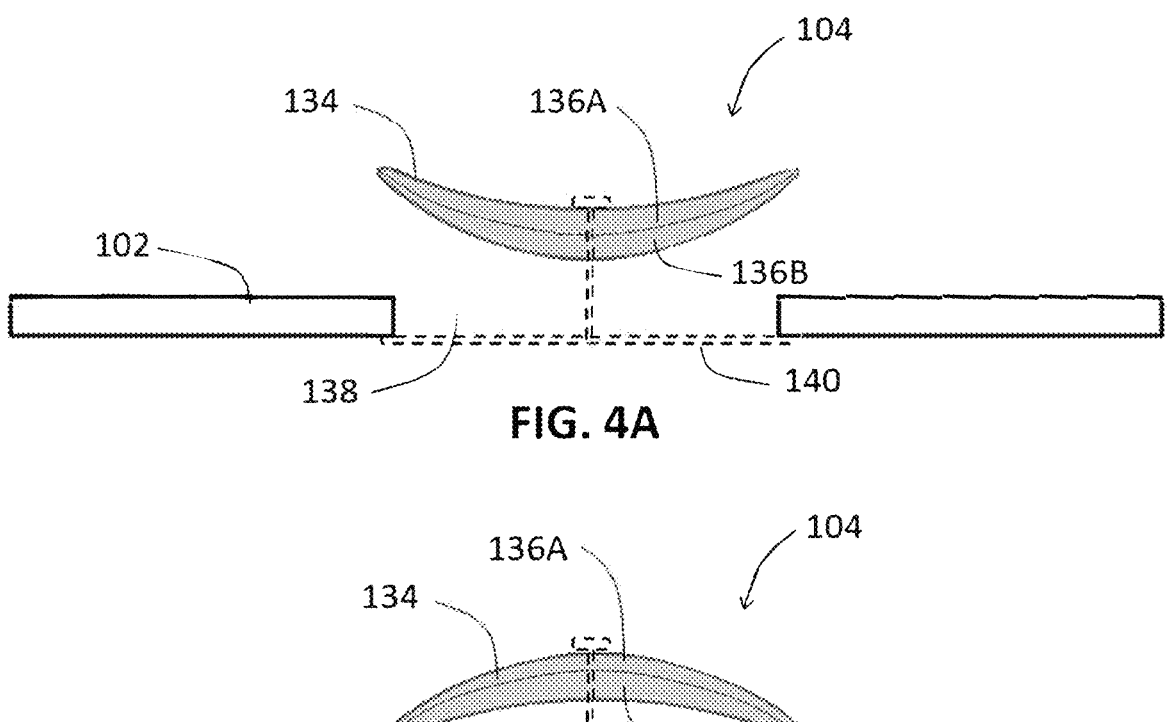
FIG. 4A
FIG. 4B
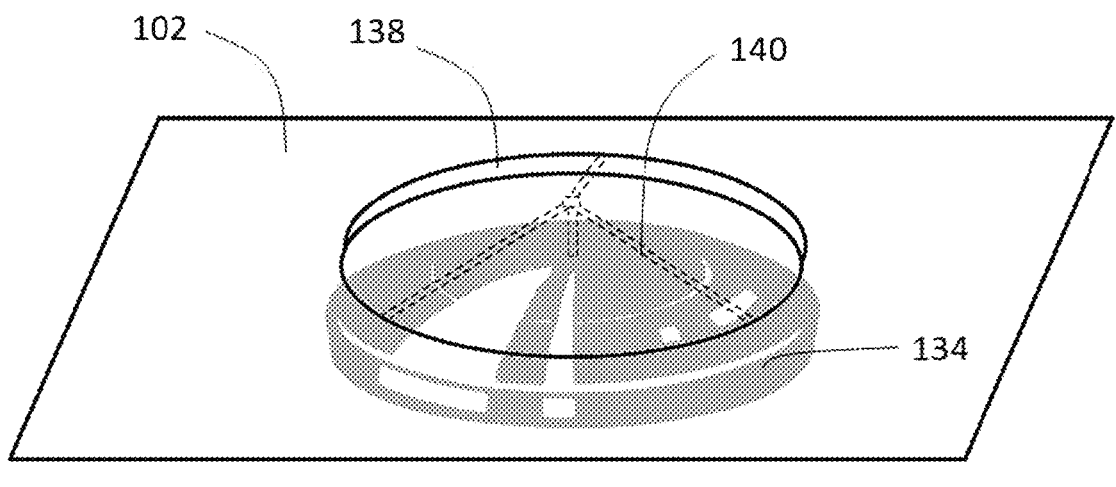
FIG. 4C

MECHANICAL VENT FOR BATTERY PACK

TECHNICAL FIELD

The present disclosure relates generally to batteries for electric vehicles, and more particularly to a mechanical valve/port that enables circulation of outside air within a vehicle battery pack, wherein the valve/port is configured to transition to a closed position in the event of a battery malfunction which typically produces gasses, thereby trapping the gasses within a sealed battery pack.

BACKGROUND

Electric vehicles are becoming increasingly popular as consumers look to decrease their environmental impact and improve air quality. Instead of a traditional internal combustion engine, electric vehicles include one or more motors, powered by a rechargeable battery pack.

Most rechargeable battery packs are made up of one or more battery modules, each module containing a plurality of battery cells, which act as galvanic cells when being discharged by converting chemical energy to electrical energy, and electrolytic cells when being recharged by converting electrical energy to chemical energy. In many cases, the battery cells rely on lithium-ion technology.

As is well known, these battery cells can generate heat in use, thus reducing the range of the electric vehicle and the durability and overall life of the battery cells making up the rechargeable battery pack. To manage heat generation, heat exchangers and other battery cooling systems are often incorporated into the vehicle structure. In rare circumstances, a battery cell can overheat (typically as a result of damage to a battery cell), which can lead to an undesirable thermal event in which the heat propagates to the other battery cells within the battery pack (sometimes referred to as a "thermal runaway"). Self-ignition of a battery cell may occur when the temperature of the cell reaches a sufficient temperature (e.g., 120-150° C.), thereby releasing toxic gases. Specifically, burning lithium-ion batteries are known to release hydrogen fluoride (HF) gas emissions, which can pose a serious toxic threat if inhaled.

Although sealed battery compartments have been developed over the years to inhibit the release of gas emission in the event of a thermal runaway, further improvements in the ability of a battery pack to breathe or otherwise enable a flow of fresh air over the cells to dissipate heat in use, while sealing the cells within an airtight container in the event of an overheating condition is desired. The present disclosure addresses this concern.

SUMMARY OF THE DISCLOSURE

Embodiments of the present disclosure provide a mechanical valve or port that enables circulation of outside air within a vehicle battery pack, wherein the valve or port is configured to transition from an open, venting position to a sealed, closed position in the event of a battery thermal event has the potential to produce one or more toxic gases, thereby trapping the gasses within a sealed battery pack.

One embodiment of the present disclosure provides a vent for an electric vehicle battery pack configured to transition from a venting, open position to a sealed, closed position in the event of a thermal event experienced by the electric vehicle battery pack, thereby trapping the gasses within the electric vehicle battery pack, including a curved disc shaped and sized to selectively seal an aperture defined by the electric vehicle battery pack, the curved disc formed of a first material positioned on a first major surface of the disc, and a second material positioned on an opposing second major surface of the disc, the first material having a larger coefficient of thermal expansion than the second material, such that an increase in temperature above a defined threshold experienced by the curved disc causes the first material to expand more than the second material, thereby transitioning the curved disc from a first equilibrium state representing the open, venting position to a second equilibrium state representing the sealed, closed position.

In one embodiment, the first material comprises at least one of a metal, alloy, polymer, or composite, and the second material comprises at least one of a metal, alloy, polymer, or composite having a different coefficient of thermal expansion than the first material. In one embodiment, the curved disc is a bistable, bimetallic element. In one embodiment, the curved disc is tuned to transition from the first equilibrium state to the second equilibrium state at a designated temperature in a range of between about 100° C. and about 180° C. In one embodiment, the curved disc is tuned to transition from the first equilibrium state to the second equilibrium state at a temperature above about 140° C. In one embodiment, the curved disc is configured to transition from the second equilibrium state to the first equilibrium state at a temperature below about 140° C.

In one embodiment, the curved disc is positioned on an inside of the electric vehicle battery pack, wherein upon transitioning to the second equilibrium state representing the sealed, closed position, a subsequent increase in pressure within the electric vehicle battery pack causes an increase in forced contact between the curved disc and a portion of the electric vehicle battery pack, further inhibiting an escape of gas from within the electric vehicle battery pack. In one embodiment, the curved disc is positioned on an outside of the electric battery pack, wherein upon transitioning to the second equilibrium state representing the sealed, closed position, a subsequent increase in pressure within the electric vehicle battery pack above a defined threshold deforms the curved disc away from the second equilibrium state, thereby enabling a burping of high-pressure gas from within the electric vehicle battery pack to inhibit a sudden rupture of the electric vehicle battery pack.

Another embodiment of the present disclosure provides an electric vehicle having one or more vents configured to enable a passage of cooling air to flow through a battery pack, the one or more vents configured to transition from a venting, open position to a sealed, closed position in the event of a thermal event experienced by the battery pack, thereby trapping the gasses within the battery pack, including a battery tray configured to serve as an outer shell of the battery pack, the battery tray defining one or more apertures configured to enable a passage of cooling air to flow through the battery pack, and one or more curved discs shaped and sized to selectively correspondingly seal the one or more apertures defined by the battery tray, each curved disc formed of a first material representing a first major surface of the disc, and a second material representing an opposing second major surface of the disc, the first material having a larger coefficient of thermal expansion than the second material, such that an increase in temperature above a defined threshold experienced by the curved disc causes the first material to expand more than the second material, thereby transitioning the curved disc from a first equilibrium state representing the open, venting position to a second equilibrium state representing the sealed, closed position.

In one embodiment, the first material comprises at least one of a metal, alloy, polymer, or composite, and the second material comprises at least one of a metal, alloy, polymer, or composite having a different coefficient of thermal expansion than the first material. In one embodiment, the curved disc is a bimetallic element. In one embodiment, the curved disc is tuned to transition from the first equilibrium state to the second equilibrium state at a designated temperature in a range of between about 100° C. and about 180° C. In one embodiment, the curved disc is tuned to transition from the first equilibrium state to the second equilibrium state at a temperature above about 140° C. In one embodiment, the curved disc is configured to transition from the second equilibrium state to the first equilibrium state at a temperature below about 140° C.

Another embodiment of the present disclosure provides a vent for an electric vehicle battery pack configured to transition from a venting, open position to a sealed, closed position in the event of a thermal event experienced by the electric vehicle battery pack, thereby trapping gasses within the electric vehicle battery pack, including a sealing member operably coupled to the electric vehicle battery pack via an elastic member, wherein the seal member is configured to selectively seal an aperture defined by the electric vehicle battery pack, and a heat sensitive member configured to maintain the elastic member in a compressed state representing the open, venting position, wherein the heat sensitive member is configured to change shape upon exposure to a temperature above a defined threshold, thereby enabling the elastic member to expand to movably force the seal member against a portion of the battery pack, representing the closed, sealed position.

In one embodiment, the heat sensitive member is a single use member configured to at least one of rupture or mount upon the exposure to a temperature above the defined threshold. In one embodiment, the heat sensitive member is configured to change shape upon exposure to a temperature in a range of between about 100° C. and about 180° C. In one embodiment, the heat sensitive member is configured to change shape upon exposure to a temperature above about 140° C. In one embodiment, the sealing member is positioned on an inside of the electric vehicle battery pack, wherein upon transitioning to the sealed, closed position, a subsequent increase in pressure within the electric vehicle battery pack causes an increase in forced contact between the sealing member and a portion of the electric vehicle battery pack, further inhibiting an escape of gas from within the electric vehicle battery pack. In one embodiment, the sealing member is positioned on an outside of the electric battery pack, wherein upon transitioning to the sealed, closed position, a subsequent increase in pressure within the electric vehicle battery pack breaks a seal formed between the sealing member and the electric vehicle battery pack, thereby enabling a burping of high-pressure gas from within the electric vehicle battery pack to inhibit a sudden rupture of the electric vehicle battery pack.

Another embodiment of the present disclosure provides a vent for an electric vehicle battery pack configured to transition from a venting, open position to a sealed, closed position upon the occurrence of a rapid rise in pressure within the electric vehicle battery pack, thereby trapping gasses within the electric vehicle battery pack, including a curved disc shaped and sized to selectively seal an aperture defined by the electric vehicle battery pack, the curved disc formed of monolithic material configured to transition from a first equilibrium state representing the open, venting position to a second equilibrium state representing the sealed, closed position upon the application of fluid pressure.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which:

FIG. 4A is a cross-sectional view of a valve or port configured to transition between an open, venting position and a sealed, closed position, wherein the valve or port is depicted in the open, venting position, in accordance with an embodiment of the disclosure.

FIG. 4B is a cross-sectional view of the valve or port of FIG. 4A, wherein the valve or port is depicted in the closed, sealed position, in accordance with an embodiment of the disclosure.

FIG. 4C is a perspective view of a valve or port configured to transition between an open, venting position and a sealed, closed position, wherein the valve or port is depicted in the open, venting position, in accordance with an embodiment of the disclosure.

Figure 1:
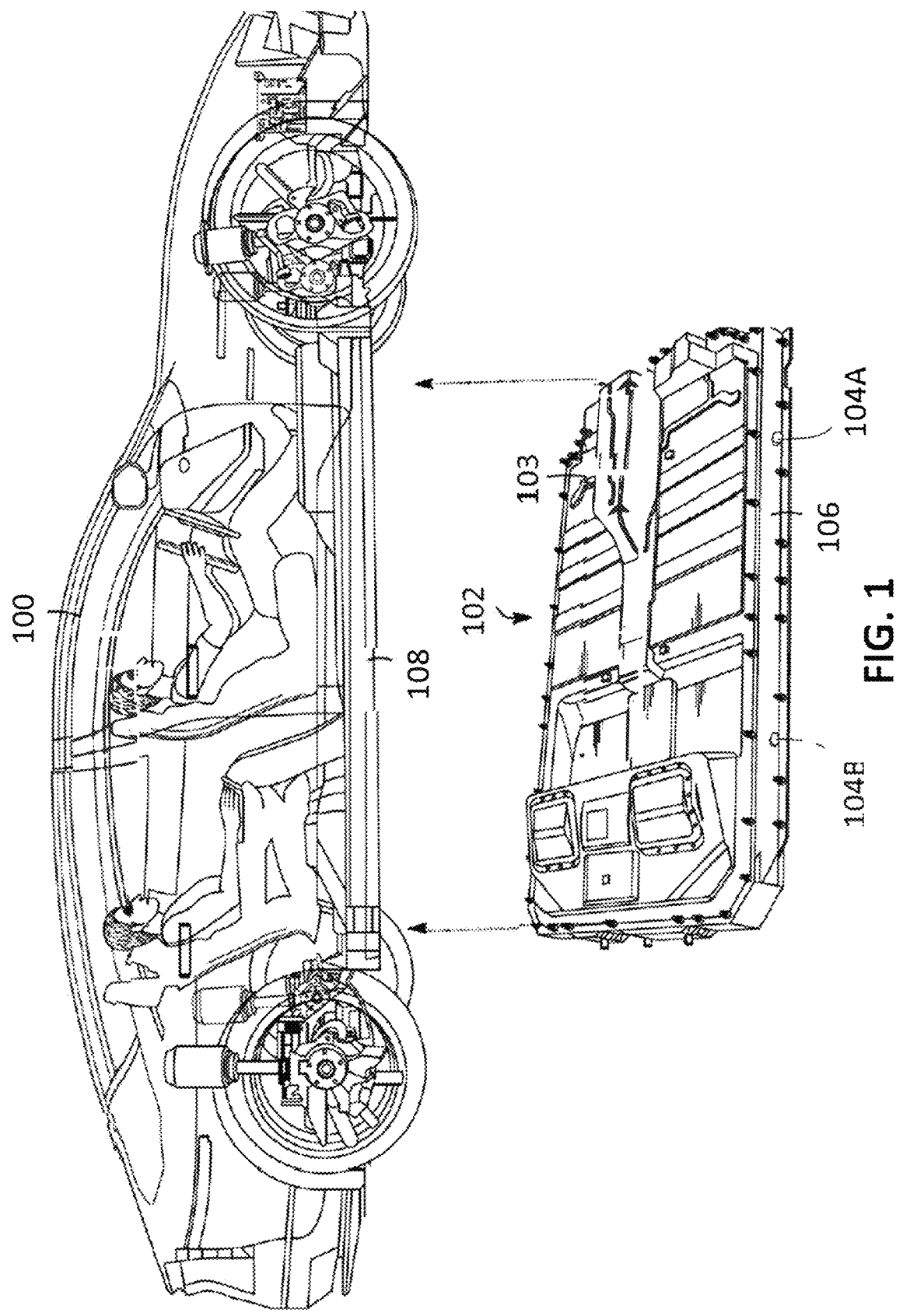
FIG. 1 is a perspective view depicting an electric vehicle comprising a battery pack configured to enable circulation of outside air within the vehicle battery pack, wherein one or more valves or ports are configured to transition from an open, bending position to a sealed, closed position in the event of a battery thermal event to trap any toxic gas produced during the thermal event within the sealed battery pack, in accordance with an embodiment of the disclosure.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Referring to FIG. 1, an electric vehicle 100 comprising a battery pack 102 having one or more valves or ports 104A-B configured to enable circulation of outside air within the vehicle battery pack 102, wherein one or more valves or ports 104A-B is configured to fail safe from an open, venting position to a sealed, closed position in the event of a battery thermal event to trap any toxic gas produced during the thermal event within the sealed battery pack 102, is depicted in accordance with an embodiment of the disclosure. In embodiments, the battery pack 102 can include a cover 103 operably coupled to a battery tray 106, thereby creating a sealable battery cell compartment containing clusters of individual battery cells and other battery related components. The assembled battery pack 102 can then be mounted to the frame and/or chassis of the vehicle 100, which in some embodiments can be positioned adjacent to a cabin floor 108 of the vehicle 100, thereby maintaining a low center of gravity.

Various embodiments of the present disclosure will be described in detail with reference to the drawings, wherein like reference numerals represent like parts and assemblies throughout the several views. Various directions and orientations, such as "upward," "downward," "top," "bottom," "upper," "lower", etc. are generally described herein with reference to the drawings in the usual gravitational frame of reference, regardless of how the components may be oriented.

Figure 2:
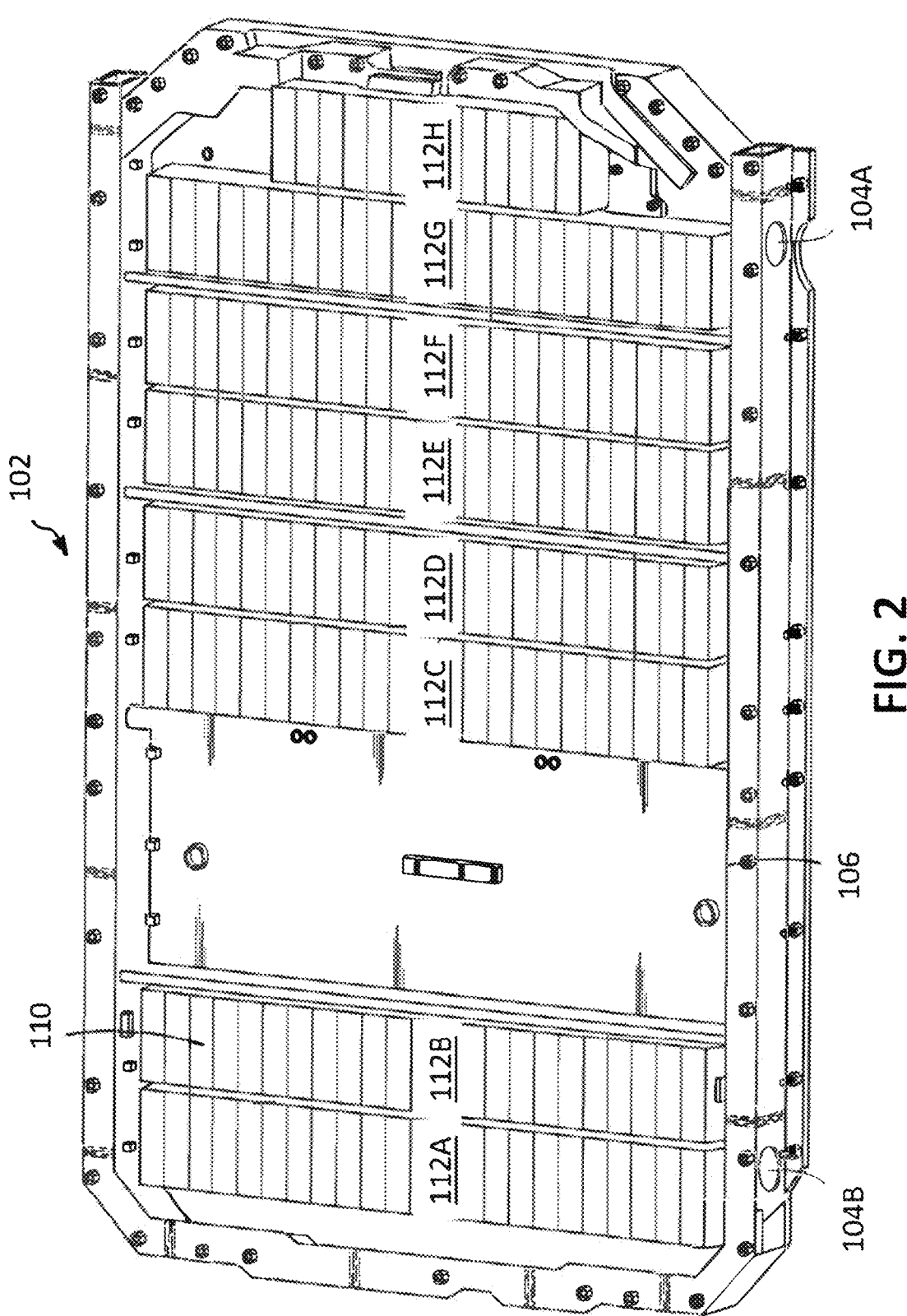
FIG. 2 is a perspective view depicting a multi-cell battery pack having one or more valves or ports configured to enable circulation of outside air within the multi-cell battery pack, while selectively sealing the multi-cell battery pack upon detection of a thermal event, in accordance with an embodiment of the disclosure.

With additional reference to FIG. 2, a multi-cell battery pack 102 having one or more valves or ports 104A-B to enable circulation of outside air within a vehicle battery pack 102, while selectively sealing the multi-cell battery pack 102 upon the detection of a thermal event, is depicted in accordance with an embodiment of the disclosure. As depicted, the individual cells 110 are grouped into eight distinct clusters, sometimes referred to as battery modules 112A-H; although the grouping of the individual cells 110 into other quantities of clusters of varying shapes and sizes is also contemplated. In addition to the modules 112A-H, the battery pack 102 can include one or more electrical current transmission systems, temperature control systems, safety systems, battery management systems (BMS), and structural support systems (in addition to the structural support provided by the battery tray 106 itself).

It has been observed that optimal battery cell 110 performance is more likely to occur within a desired temperature range (e.g., 40-45° C., etc.), with a maximum/not to exceed temperature (e.g., 60° C.) being above the desired temperature range. Accordingly, in embodiments of the disclosure, the multi-cell battery pack 102 can include one or more valves or ports 104A-B configured to enable a flow of cooling air from outside of the battery pack 102 to flow over the cells 110/modules 112A-H, thereby providing a beneficial cooling effect as the cells produce heat during use. For example, in some embodiments, a first valve or port 104A (potentially positioned on a forward portion of the battery pack 102) can be configured to encourage an inflow of air into the battery pack 102, while a second valve or port 104B (potentially positioned on a rearward portion of the battery pack 102) can be configured to encourage an out flow of air from the battery pack 102, thereby encouraging circulation of cooling air over the cells 110/modules 112A-H; although the use of other valve or port configurations is also contemplated.

In rare cases, individual battery cells 110 within a multi-cell battery pack 102 can exhibit thermal characteristics above a desired temperature range (e.g., above the maximum/not to exceed temperature), which may result in a failure (e.g., thermal runaway, etc.) of the individual cell 110. The source of heat may be created internally (e.g., within the cell 110) or may originate from an external source (e.g., outside of the cell 110 or battery tray 106). One internal heat source can occur when one or more individual cells 110 experience a high rate of discharge, which may occur when the vehicle 100 is under heavy acceleration and/or driving up a hill, etc. This type of internal heat is considered part of the normal operation of the vehicle 110, but is monitored for exceptional circumstances, which may occur during extremely hot weather or other predetermined or unforeseen circumstances. Abnormal thermal characteristics within an individual cell 110 can also occur as a result of internal damage (e.g., impact, crushing, etc.), which can result in a thermal runaway.

The heat produced by a high rate of discharge within an individual cell 110 is generally a function of an electrical current and an internal electrical resistance of the cell 110. The cells 110 are generally more sensitive to high temperatures when a voltage within the cell is relatively high. This volatility is dependent upon cell chemistry (e.g., a lithium-ion reaction, nickel-cadmium reaction, etc.) and varies among different types of cells 110 contemplated for use. In the event that a single cell 110 may enter into a thermal runaway, the heat produced by the overheated cell 110 may transfer to adjacent cells 110 (e.g., within a module 112) thereby raising the temperature of the adjacent cells 110 to a point the propagation of the thermal event throughout the entire battery pack 102.

In situations where one or more individual battery cells 110 are experiencing thermal characteristics above a desired temperature range, heat energy from the cells 110 causes the temperature of the air within the battery pack 102 to rise, which can trigger a closing of the one or more valves or ports 104A-B, thereby transitioning the one or more valves or ports 104A-B from an open, venting position to a sealed, closed position to trap any toxic gas produced during the thermal event within the sealed battery pack 102.

Figure 3:
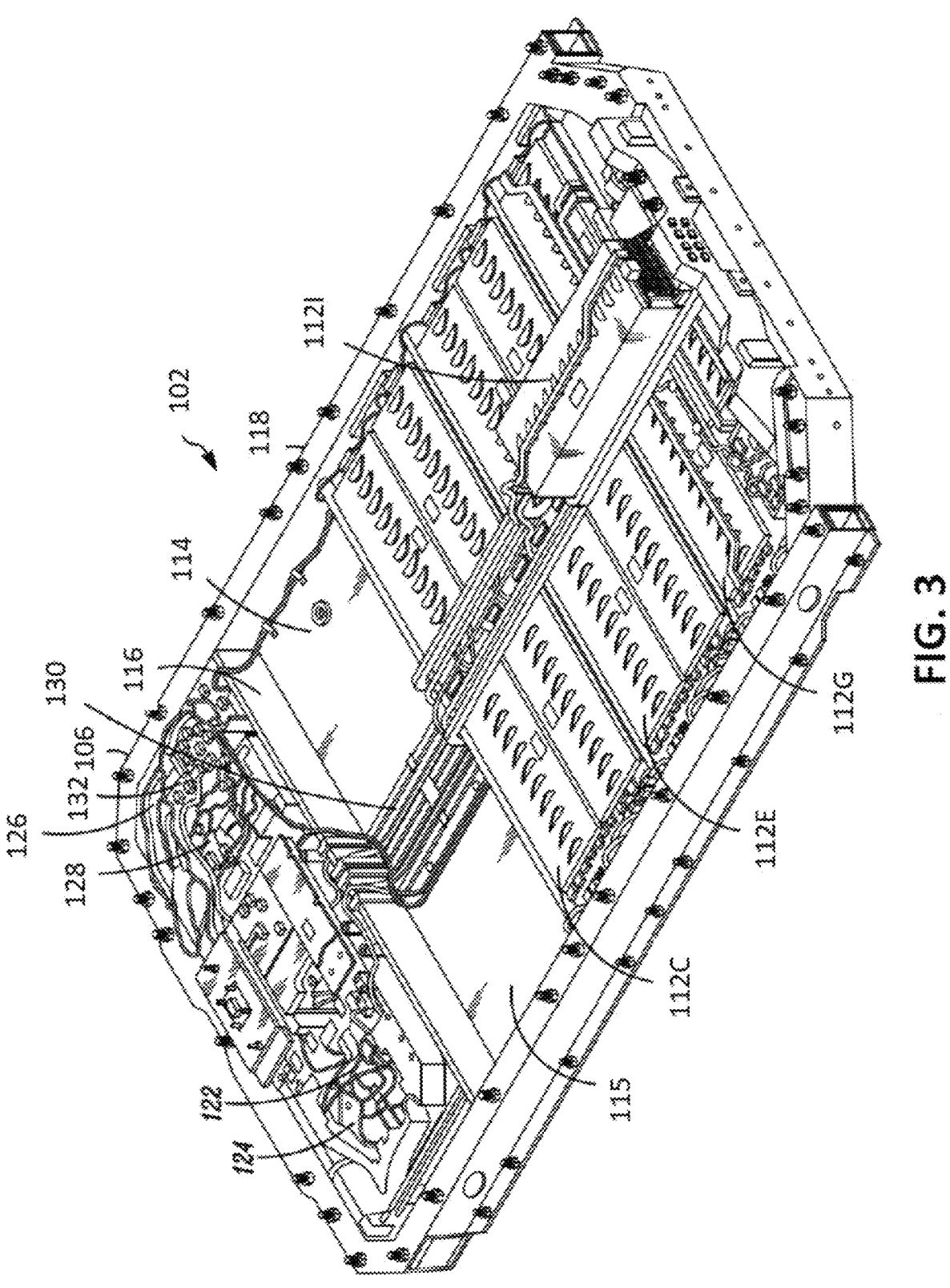
FIG. 3 is a perspective view depicting a vehicle battery pack tray loaded with a plurality of battery pack components configured to enable circulation of outside air within the vehicle battery pack tray, wherein one or more valves or ports are configured to failsafe from an open, venting position to a sealed, closed position upon the occurrence of a battery thermal event, in accordance with an embodiment of the disclosure.

With additional reference to FIG. 3, a multi-cell battery pack 102 configured to enable circulation of outside air within the vehicle battery pack 102, wherein one or more valves or ports 104A-B is configured to fail safe from an open, venting position to a sealed, closed position in the event of a battery thermal event is depicted in accordance with an embodiment of the disclosure. As depicted, the battery tray 106 can represent a bottom and one or more sides of a structural vessel 114 defining a compartment 115. Further, in embodiments, the battery tray 106 can include one or more structural supports, such as cross members 116, which can provide structural support to the battery pack 102, as well as surfaces within the compartment 115 on which other components of the battery pack can be affixed.

In addition to the battery modules 112A-I, a variety of components can be packed into the compartment 115 before the cover 103 (as depicted in FIG. 1) is affixed to a top surface 118 of the battery tray 106, thereby sealing the compartment 115. In some embodiments, the components can include an electrical current transmission system 122, safety system 124, battery management system 126 (including current management systems 128), and a battery bus bar 130 interconnecting the various components 112A-I, 122, 124, 126, and 128. Once the components have been positioned within the compartment 115, the cover 103 can be affixed to the top surface 118 via a plurality of fasteners, adhesive, or a combination thereof.

In some embodiments, the battery management system 126 or other components of the multi-cell battery pack can include one or more sensors 132 for monitoring a physical state of the individual cells 110 during operation. Such sensors include, but are not limited to measurement of temperature, pressure, voltage, amperage, and other ambient conditions (e.g., the presence of smoke or fumes, the presence of liquid, etc.) within the battery tray 106. Data from the sensors 132 can then be used by hardware and software to make intelligent decisions to control affect cooling and otherwise regulate a temperature of the individual cells 110.

With additional reference to FIGS. 4A-C, a valve or port 104 configured to transition between an open, venting position (as depicted in FIG. 4A) to a sealed, closed position (as depicted in FIG. 4B) is depicted in accordance with an embodiment of the disclosure. As depicted in FIG. 4C, in some embodiments, the valve or port 104 can generally be in the form of a convex or curved disc 134, wherein the disc is formed of a first material 136A on one side of the disc, and a second material 136B on an opposing side or surface of the disc. As depicted, the disc 134 can be operably coupled to the battery pack 102 via a bracket 140 configured to enable passage of air through an aperture 138 defined by the battery pack 102 when the valve or port 104 is in the venting, open position.

In embodiments, the first material 136A can have a different coefficient of thermal expansion than the second material 136B, such that an increase in temperature above a defined threshold experienced by the disc 134 causes the first material 136A to expand at a larger magnitude/faster rate than the second material 136B, thereby rapidly transitioning the disc 134 from the equilibrium state of an open, venting position to the equilibrium state of the sealed, closed position, thereby sealing an aperture 138 defined by the battery pack 102. Conversely, when the temperature experienced by the disc 134 decreases below a defined threshold, the first material 136A can contract in size relatively more than the second material 136B, thereby rapidly transitioning the disc 134 from the equilibrium state of the sealed, closed position, back to the equilibrium state of an open, venting position.

In embodiments, the first and second materials 136A-B can be of a variety of metals, alloys, polymers, composites, or the like, provided that the first material 136A has a relatively larger a coefficient of thermal expansion (e.g., expands and contracts more over a given temperature range) than the second material 136B. Accordingly, in embodiments, the first and second materials 136A-B can be tuned to cause the valve or port 104 to selectively transition from one equilibrium state to another equilibrium state at a desired threshold temperature. For example, in one embodiment, the valve or port 104 can be configured to transition from the open, venting position to the sealed, closed position at about 140° C. In other embodiments, the valve or port can be configured to transition in a range of between about 100° C. and about 180° C., although other ranges of triggering or threshold temperatures are also contemplated.

Figure 5A:
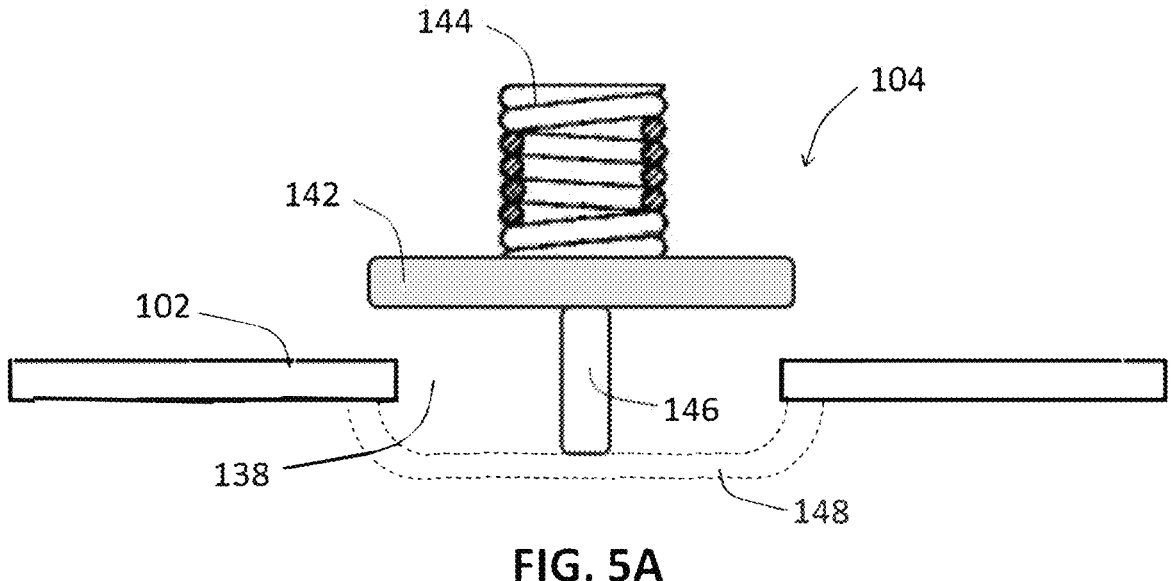
FIG. 5A is a cross-sectional view of a single use valve or port configured to transition between an open, venting position and a sealed, closed position, wherein the valve or port is depicted in the open, venting position, in accordance with an embodiment of the disclosure.
Figure 5B:
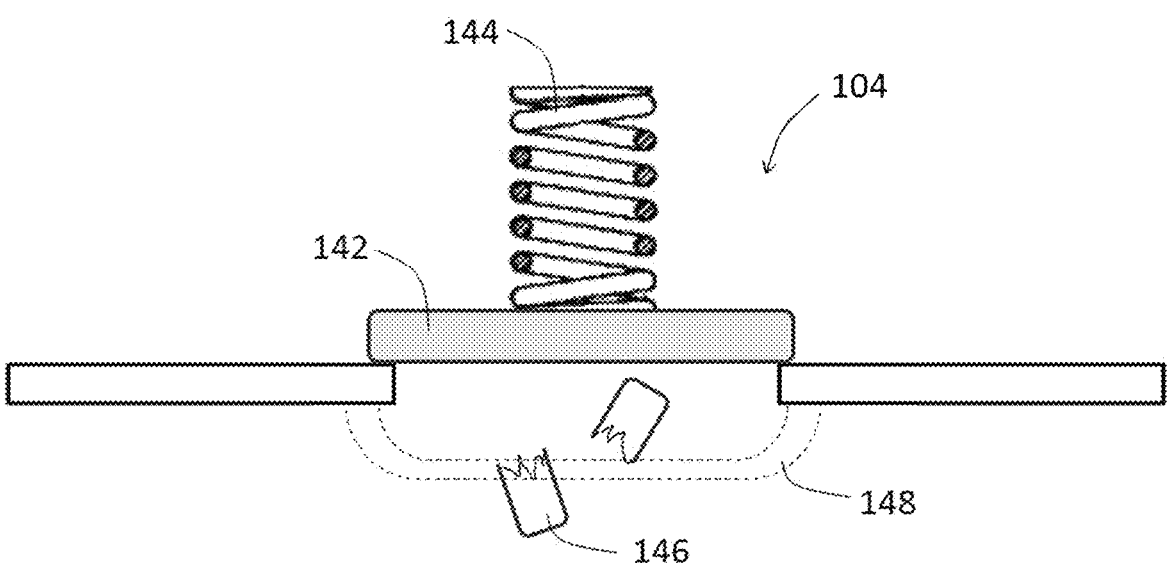
FIG. 5B is a cross-sectional view of the single use valve or port of FIG. 5A, wherein the valve or port is depicted in the closed, sealed position, in accordance with an embodiment of the disclosure.

Referring to FIGS. 5A-B, in another embodiment, the valve or port 104 can be a single use valve, configured to transition from an open, venting position to a sealed, closed position in the event of a detected thermal condition. For example, in one embodiment, the valve or port 104 can include a seal member 142 operably coupled to the battery pack 102 via an elastic member 144, such that the seal member 142 is configured to selectively seal an aperture 138 defined by the battery pack 102. For example, in some embodiments, the elastic member 144 can be a coil spring configured to transition between a compressed state (as depicted in FIG. 5A) in which the valve or port 104 is in the open, venting position to a relaxed, at least partially uncompressed state, (as depicted in FIG. 5B) in which the valve or port 104 is in the closed, sealed position. Other types of elastic members 144 are also contemplated.

In embodiments, a heat sensitive member 146 can be configured to maintain the elastic member 144 in the compressed state, while the valve or port 104 is in the open, venting position. For example, in some embodiments, the heat sensitive member 146 can be positioned between a bracket 148 and the seal member 142. The heat sensitive member 146 can be configured to rupture, melt, or otherwise change in shape upon exposure to a desired temperature threshold, thereby enabling the elastic member 144 to movably force the seal member 142 against a portion of the battery pack 102, thereby sealing the aperture 138. As previously discussed, the desired temperature threshold can be tailored to suit the needs of the battery pack 102.

In embodiments, the sealing member 142 or disc 134, 150 can be positioned on an inside of the battery pack 102, such that if/when the valve or port 104 transitions to the sealed, closed position, an increase in pressure within the sealed battery pack 104 can increase a forced contact between the sealing member 142 or disc 134 and a portion of the battery pack 102, thereby further inhibiting gas from within the battery pack 102 from escaping. In other embodiments, the sealing member 142 or disc 134 can be positioned on an outside of the battery pack 102, such that if/when the valve or port 104 transitions to the sealed, closed position, an increase in pressure within the sealed battery pack 104 beyond a desired threshold can force the sealing member 142 or disc 134 away from the battery pack 102, thereby enabling a burping or venting of high-pressure gas to inhibit a sudden rupture or explosion of the battery pack 102.

Figure 6A:
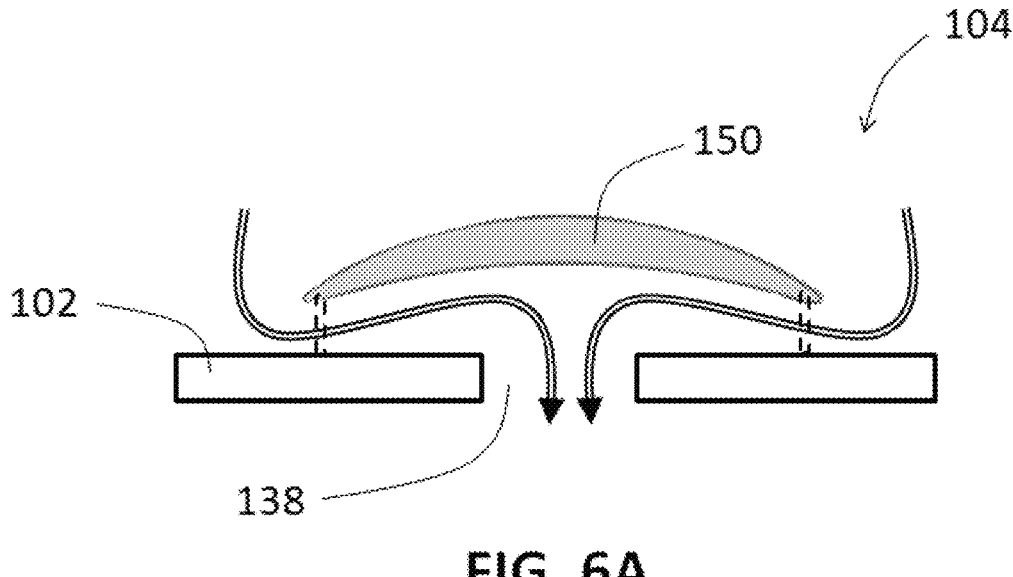
FIG. 6A is a cross-sectional view of a valve or port configured to transition between an open, venting position and a sealed, closed position, wherein the valve or port is depicted in the open, venting position, in accordance with an embodiment of the disclosure.
Figure 6B:
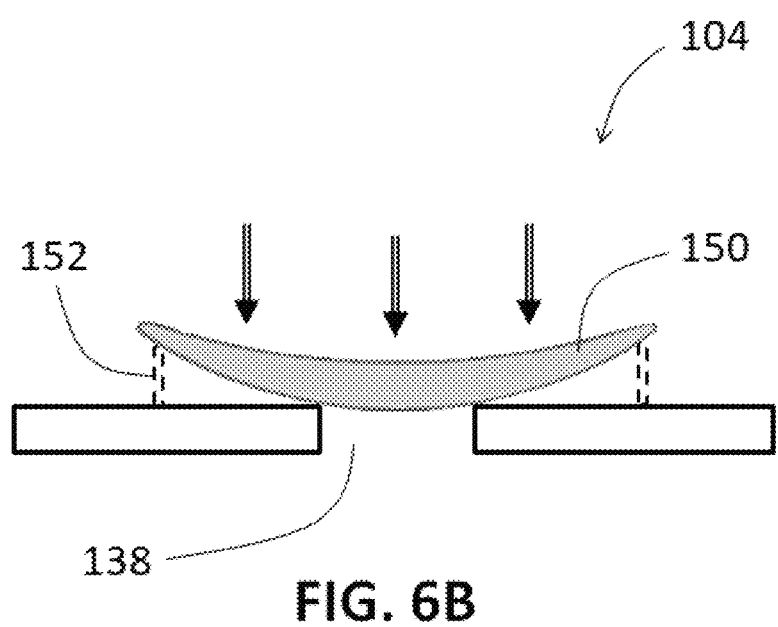
FIG. 6B is a cross-sectional view of the valve or port of FIG. 6A, wherein the valve or port is depicted in the closed, sealed position, in accordance with an embodiment of the disclosure.

With additional reference to FIGS. 6A-B, a valve or port 104 configured to transition between an open, venting position (as depicted in FIG. 6A) to a sealed, closed position (as depicted in FIG. 6B) is depicted in accordance with an embodiment of the disclosure. Similar to previous embodiments, the valve or port 104 can generally be in the form of a convex or curved disc 150; however, unlike previous embodiments, the convex curved disc 150 can be constructed of a monolithic material (e.g., a single layer of a flexible metal alloy or the like). As depicted, the disc 150 can be operably coupled to the battery pack 102 via a bracket 152 configured to enable passage of air through an aperture 138 defined by the battery pack 102 when the valve or port 104 is in a venting, open position. In the occurrence of a thermal event, gas produced by battery cells experiencing thermal runaway will cause the pressure to rapidly rise within the battery pack 102, which in turn can cause a rapid transition in the disc 150 from the equilibrium state of an open, venting position to the equilibrium state of the sealed, closed position, thereby sealing an aperture 138 defined by the battery pack 102.

The invention is further illustrated by the following embodiments:

A vent for an electric vehicle battery pack configured to transition from a venting, open position to a sealed, closed position in the event of a thermal event experienced by the electric vehicle battery pack thereby trapping gasses within the electric vehicle battery pack, the vent comprising: a curved disc shaped and sized to selectively seal an aperture defined by the electric vehicle battery pack configured to transition from a first equilibrium state representing an open, venting position to a second equilibrium state representing a sealed, closed position.

A system or method according to any embodiment, wherein the curved disc is formed of monolithic material configured to transition from a first equilibrium state representing the open, venting position to a second equilibrium state representing the sealed, closed position upon the application of fluid pressure.

A system or method according to any embodiment, wherein the curved disc is formed of a first material on a first major surface of the disc, and a second material on an opposing second major surface of the curved disc the first material having a larger coefficient of thermal expansion than the second material, such that an increase in temperature above a defined threshold experienced by the curved disc causes the first material to expand more than the second material, thereby transitioning the curved disc from a first equilibrium state representing the open, venting position to a second equilibrium state representing the sealed, closed position.

A system or method according to any embodiment, wherein the first material comprises at least one of a metal, alloy, polymer, or composite, and the second material comprises at least one of a metal, alloy, polymer, or composite having a different coefficient of thermal expansion than the first material.

A system or method according to any embodiment, wherein the curved disc is a bistable, bimetallic element.

A system or method according to any embodiment, wherein the curved disc is tuned to transition from the first equilibrium state to the second equilibrium state at a designated temperature in a range of between about 100° C. and about 180° C.

A system or method according to any embodiment, wherein the curved disc is tuned to transition from the first equilibrium state to the second equilibrium state at a temperature above about 140° C.

A system or method according to any embodiment, wherein the curved disc configured to transition from the second equilibrium state to the first equilibrium state at a temperature below about 140° C.

A system or method according to any embodiment, wherein the curved disc is positioned on an inside of the electric vehicle battery pack whereupon transitioning to the second equilibrium state representing the sealed, closed position, a subsequent increase in pressure within the electric vehicle battery pack causes an increase in forced contact between the curved disc and a portion of the electric vehicle battery pack further inhibiting an escape of gas from within the electric vehicle battery pack.

A system or method according to any embodiment, wherein the curved disc is positioned on an outside of the electric battery pack whereupon transitioning to the second equilibrium state representing the sealed, closed position, a subsequent increase in pressure within the electric vehicle battery pack above a defined threshold deforms the curved disc away from the second equilibrium state, thereby enabling a burping of high-pressure gas from within the electric vehicle battery pack to inhibit a sudden rupture of the electric vehicle battery pack.

A system or method according to any embodiment, further comprising a battery tray configured to serve as an outer shell of the battery pack, the battery tray defining the aperture configured to enable a passage of the cooling air to flow through the battery pack.

An electric vehicle comprising the vent for an electric vehicle battery pack according to any embodiment of the disclosure.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. An electric vehicle comprising an electric vehicle battery pack having one or more vents configured to enable a passage of cooling air to flow through a battery pack, the one or more vents configured to transition from a venting, open position to a sealed, closed position in an event of a thermal event experienced by the battery pack, thereby trapping gas within the battery pack, the electric vehicle comprising:

a battery tray configured to serve as an outer shell of the battery pack, the battery tray defining one or more apertures configured to enable a passage of the cooling air to flow through the battery pack; and one or more curved discs shaped and sized to selectively correspondingly seal the one or more apertures defined by the battery tray, each curved disc formed of a first material on a first major surface of the disc, and a second material on an opposing second major surface of the disc, the first material having a larger coefficient of thermal expansion than the second material, such that an increase in temperature above a defined threshold experienced by the curved disc causes the first material to expand more than the second material, thereby transitioning the curved disc from a first equilibrium state representing the venting, open position to a second equilibrium state representing the sealed, closed position, wherein in the second equilibrium state, the curved disc seals the aperture of the electric vehicle battery pack by directly contacting the aperture, wherein the disc is axially spaced apart from the aperture in at least the open position.

2. The electric vehicle of claim 1, wherein the first material comprises at least one of a metal, alloy, polymer, or composite, and the second material comprises at least one of a metal, alloy, polymer, or composite having a different coefficient of thermal expansion than the first material.

3. The electric vehicle of claim 1, wherein the curved disc is a bistable, bimetallic element.

4. The electric vehicle of claim 1, wherein the curved disc is tuned to transition from the first equilibrium state to the second equilibrium state at a designated temperature in a range of between about 100° C. and about 180° C.

5. The electric vehicle of claim 1, wherein the curved disc is tuned to transition from the first equilibrium state to the second equilibrium state at a temperature above about 140° C.

6. The electric vehicle of claim 5, wherein the curved disc is configured to transition from the second equilibrium state to the first equilibrium state at a temperature below about 140° C.

7. The electric vehicle of claim 1, wherein:

in the first equilibrium state, the curved disc is curved toward a first direction; and in the second equilibrium state, the curved disc is curved toward a second direction opposite the first direction.

*     *     *     *     *